(12) United States Patent
McGlashan-Powell et al.

(10) Patent No.: US 8,977,124 B2
(45) Date of Patent: Mar. 10, 2015

(54) MULTI-NODE SYSTEM NETWORKS WITH OPTICAL SWITCHES

(75) Inventors: Maurice McGlashan-Powell, Kingson (JM); Valentine Salapura, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 13/462,205

(22) Filed: May 2, 2012

(65) Prior Publication Data

US 2013/0294771 A1 Nov. 7, 2013

(51) Int. Cl.
*H04J 14/00* (2006.01)
*H04B 10/80* (2013.01)
*H04Q 11/00* (2006.01)

(52) U.S. Cl.
CPC .............. *H04J 14/00* (2013.01); *H04B 10/801* (2013.01); *H04Q 11/0005* (2013.01); *H04Q 11/0066* (2013.01); *H04Q 2011/0073* (2013.01)
USPC .................................. 398/57; 398/45; 398/49

(58) Field of Classification Search
CPC ...... G02B 6/43; G02B 6/2848; G02B 6/2746; H04B 10/801; H04J 14/00; H04Q 11/0005; H04Q 2011/0073; H04Q 11/0066
See application file for complete search history.

(56) References Cited

U.S. PATENT DOCUMENTS

| 6,493,139 B1 | 12/2002 | Liu et al. |
| 6,728,484 B1* | 4/2004 | Ghani .............................. 398/42 |
| 6,816,637 B2 | 11/2004 | McGlashan-Powell et al. |
| 7,298,935 B1 | 11/2007 | Black et al. |
| 7,462,812 B2 | 12/2008 | Kai et al. |
| 2003/0091267 A1 | 5/2003 | Alvarez et al. |
| 2003/0152305 A1* | 8/2003 | McGlashan-Powell et al. ............................... 385/11 |
| 2005/0002603 A9 | 1/2005 | Beshai et al. |
| 2005/0105905 A1* | 5/2005 | Ovadia et al. ................... 398/47 |
| 2007/0258445 A1* | 11/2007 | Smith et al. .................... 370/389 |
| 2008/0025288 A1* | 1/2008 | Benner et al. ................. 370/351 |
| 2009/0180779 A1 | 7/2009 | Boduch et al. |

FOREIGN PATENT DOCUMENTS

| JP | 2002144733 | 5/2002 |
| JP | 2003209863 | 7/2003 |

OTHER PUBLICATIONS

Ma et al., "Optical Switching Technology Comparison: Optical MEMS vs. Other Technologies", IEEE Optical Communications, Nov. 2003, pp. S16-S23.

* cited by examiner

*Primary Examiner* — Ken Vanderpuye
*Assistant Examiner* — David Lambert
(74) *Attorney, Agent, or Firm* — Scully, Scott, Murphy & Presser, P.C.; Daniel P. Morris, Esq.

(57) ABSTRACT

A system and method for optical switching of networks in a multi-node computing system with programmable magneto-optical switches that enable optical signal routing on optical pathways. The system includes a network of optical links interconnecting nodes with switching elements that are controlled by electrical control signals. Data transmission is along the optical links and an optical pathway is determined by the electrical control signals which are launched ahead of optical signal. If links are available, an optical pathway is reserved, and the electrical signal sets the necessary optical switches for the particular optical pathway. There is thereby eliminated the need for optical-electrical-optical conversion at each node in order to route data packets through the network. If a link or optical pathway is not available the system tries to find an alternative path. If no alternative path is available, the system reserves buffering. After transmission, all reservations are released.

12 Claims, 5 Drawing Sheets

MULTI-NODE SYSTEM NETWORKS WITH OPTICAL SWITCHES

BACKGROUND

The present disclosure relates generally to methods and apparatuses for optical switching of networks in multi-node computer systems using optical interconnects to enable packet routing, and by using optical switching on these interconnects.

Fast networks are essential in improving the performance of high performance computing systems. The use of optical interconnects is therefore necessary by virtue of their inherent high bandwidth. Existing high performance computing systems such as Blue Gene/L and Blue Gene/P systems available from International Business Machines Corporation utilizes buffering of packets (in memory) at every node and routing on every node with electrical switching of the networks. In those embodiments, packets are routed along hops of a route or path and stored in every node, routed and injected again into the network.

Simply using optical interconnects to replace electrical interconnects would require electrical to optical conversion at each node.

It would be desirable to provide an optical switching system that eliminates the necessity of O-E-O (optical-electrical-optical) conversion and buffering at each node of the network.

SUMMARY

In a multi-node computing system with optical links to enable packet routing by using optical switching on optical links, a method and apparatus for optical switching of networks is provided.

An optical switching method and apparatus is provided that eliminates the necessity of optical to electrical conversion followed by electrical to optical conversion (O-E-O) and further eliminates buffering at each node by using fast (GHz) optical switching and routing.

In one aspect, there is provided a method of communicating optical signals in a network having multiple computing nodes. The method comprises: forming, using electrical signals, an optical path from a sender node to a destination node in the network, the sender node having a data packet for communication as an optical signal along the optical path to the destination node; and launching, from the sender node, an optical signal having data packet, over the optical path, to the destination node, wherein a need for packet buffering of data from the optical signal is eliminated at computing nodes forming the optical path.

Further to this aspect, the forming an optical path comprises reserving, using further electrical signals, plural optical links by setting optical switches that interconnect adjacent nodes of the network to form the optical path; and, releasing all reserved plural optical links for reuse after the optical signal launching.

In one aspect, the forming an optical path comprises: launching an electrical signal over a conductor from the sender node to a plurality of nodes of the network to form the optical path; determining, by the sender node, availability at each node of the plurality of nodes, to form an optical link at that node for an optical signal transmission; and using electrical signals, by the sender node, to drive optical switches at those nodes having available optical links that can form the optical path, wherein the optical path is formed for as many adjacent optically linked nodes as available.

In a further aspect, the forming an optical path is an iterative process comprising, at each iteration: launching an electrical signal over a conductor from the sender node to a respective next node of the network, wherein a next node at each iteration is a node adjacent to an immediately prior node having a formed optical link; determining, by the sender node, availability at each next node to form an optical link at that node for an optical signal transmission; and using electrical signals, by the sender node, to drive optical switches at each next node to configure the available optical link, wherein the optical path is formed for as many adjacent optically linked next nodes as available.

Advantageously, there will be a computer program product for performing operations. The computer program product will include a storage medium readable by a processing circuit and storing instructions to be run by the processing circuit for performing a method. The method is as described above.

BRIEF DESCRIPTION OF THE DRAWINGS

The objects, features and advantages of the present invention will become apparent to one ordinary skill in the art, in view of the following detailed description taken in combination with the attached drawings, in which.

DETAILED DESCRIPTION OF THE PREFERRED EMBODIMENTS

The disclosure provides a system and method for communicating optical signals in a network having multiple computing nodes. In the present disclosure, electrical control signals are used to activate the magneto-optic switches which are built into the optical networks. These signals are launched ahead of the optical signals to set the paths that link a source node to a destination node. If the optical path linking the source to the destination is available, the optical channel is reserved for the transmission of the data packet. If the path is not available, an alternative path is tried. If an alternative path is not available then the maximum length sub-path is selected, and the packet is sent on the sub-path, and on that intermittent node the optical data packet is converted to electrical signals and buffered. Once the data packet is transmitted and buffered on a node (destination or intermittent node) all reserved pathways are released. Depending on the traffic, significant latency reduction can be achieved due to reduced number of packet buffering between source and destination node.

Figure 1:
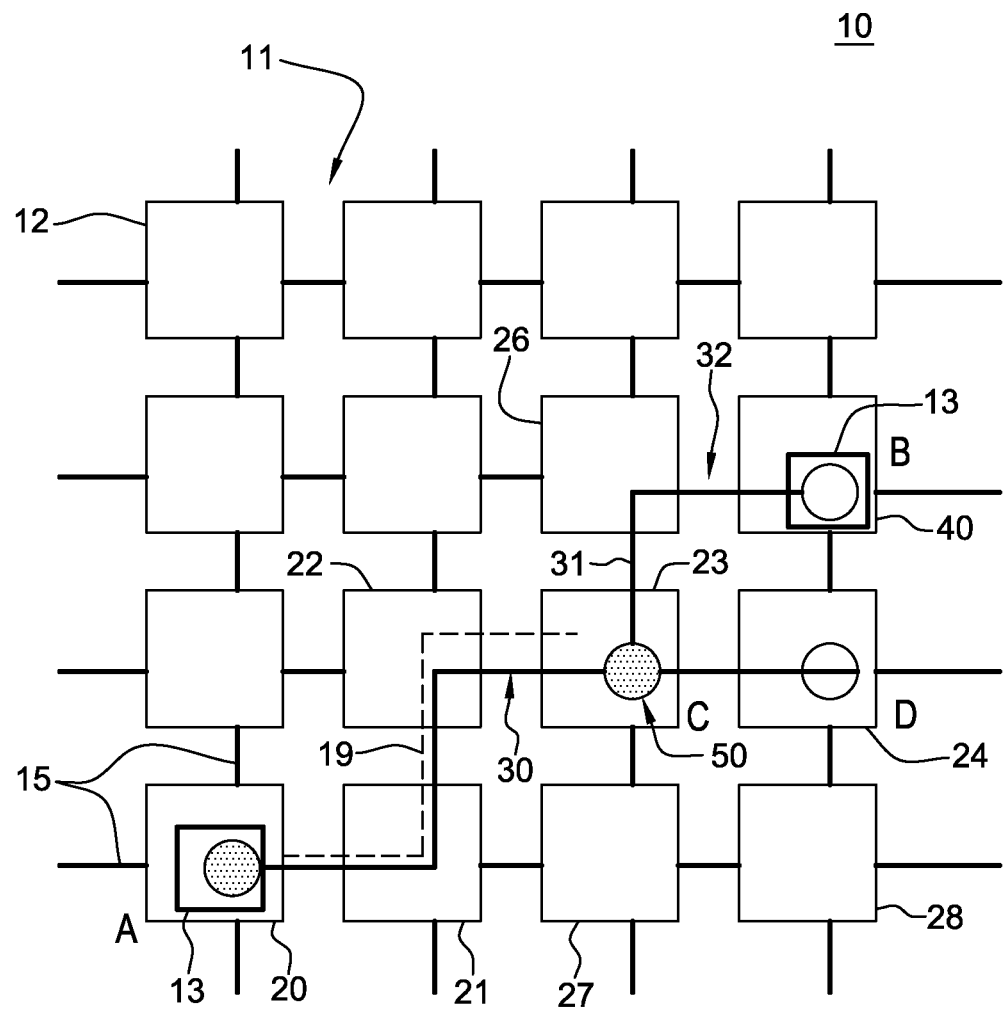
FIG. 1 shows a general system diagram of a multi-node computing system 10 implementing the principles of the various embodiments.

FIG. 1 shows a general system diagram of a system 10 in which the methods and apparatuses described herein below are implemented. The system 10 may be a high performance computing system such as BlueGene/Q system including a multi-dimensional network of multi-core processing nodes. The system may include a single printed circuit (PC) board upon which are mounted a multiple of compute processing nodes, e.g., a 4×4 mesh. In either embodiment or implementation, there is provided a single or multi-dimensional network 11 of computing nodes 12 each having a processing element such as a CPU (not shown), and an optical connection 13. Interconnecting optical connections 13 at nodes 12 are optical data links 15, i.e., optical waveguides, via optical switching elements, e.g., magnet-optical switches 50, situated at or in-between nodes. In one embodiment, those optical switches 50 include those described in commonly-owned U.S. Pat. No. 6,816,637 the whole content and disclosure of which is incorporated by reference as if fully set forth herein.

Figure 2:
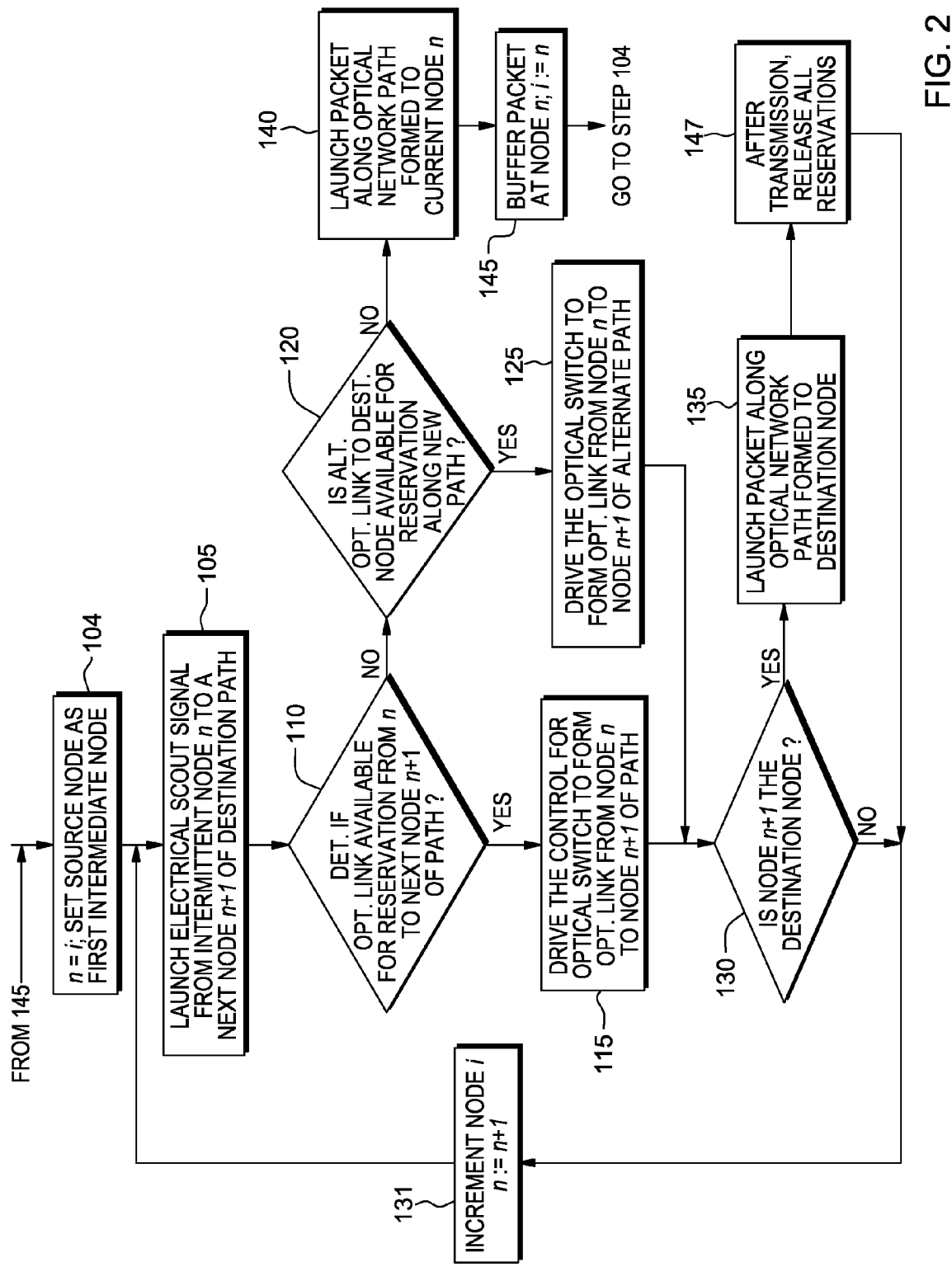
FIG. 2 shows, in one embodiment, a method 100 implemented for dynamic routing of optical signals in a multi-node computer network 10.

FIG. 2 shows, in one embodiment, a method 100 implemented for dynamic routing of optical signals in a multi-node computer network 10 of FIG. 1 according to one embodiment. As described with respect to FIG. 2, the method provides for electrically driving optical switching to dynamically route packets along a path (optical pathway) 30 from a sender node 20 that transmits the optical signal data packets to a destination node 40 while avoiding completely, or minimizing, the number of packet buffering and O-E-O conversions, i.e., hops, as possible, for the optical signal to travel to the destination node of the path.

In one embodiment, an optical pathway 30 is dynamically created by configuring optical connections and/or optical switches associated with nodes to form a path from a source node to a destination node. The dynamic optical pathway is determined ahead of time by electrical control ("scout") signals 19. The scout electrical control signals are launched on a conductive circuit path (not shown) interconnecting the nodes ahead of the optical signal transmission from the sender node 20 to nodes with available optical links to form a path from the sender node in the direction of the target or destination node. If links are available at the individual scouted nodes, the available links are reserved and the electrical signals initiate setting the necessary magneto-optical switches 50 at each the nodes to create the optical pathway 30 (in FIG. 1). Dynamic path creation is provided under electrical control, such as by a host processor device, e.g., in an originating node or sender node. If a link at a scouted node is not available, or the optical pathway is not available, the system may attempt to find an alternative path. If no alternative path is available, the system will reserve switches and transmit packet along the path to an intermittent node furthest toward the destination node and perform buffering at the intermittent node along the path. After transmission of the data packet(s), all reservations are released.

FIG. 2 shows, in one embodiment, a method 100 implemented for dynamic routing of optical signals in a multi-node computer network 10. In the following description, a sending optical node is alternately referred to as an originator node or node i; an adjacent node is alternatively referred to as a next node or node i+n that couples to an immediate prior node in one or more directions, where n is a positive number 1, 2, 3, . . . representing a number of nodes forming a destination path or optical pathway 30. At 102, FIG. 2, there is initialized the value n=i, where n is a node where a packet can be guaranteed sent.

From the originating node 20, e.g., node n (in the first iteration n is equal to the originator node i, in later iterations, n is the next intermediate node which is reserved and packet can be sent), desiring to communicate an optical signal packet including bits of information or payload data to a destination node along an optical path, an electrical control (scout) signal is first launched, e.g., from a network driver at the originating node i, at 105. A destination path may be known (e.g. from information maintained in a routing table at each node), or dynamically configured as will be described. In one embodiment, a sender node launches an electrical (scout) control signal from the sender to a next node (e.g., or an adjacent node) in an +/−x, +/−y, +/−z direction. The electrical control signal, functioning as a scout, is routed along one direction +/−x, +/−y, +/−z on an electrical circuit path to the next computing node, e.g., node i+1. In one embodiment, circuit path may include, but is not limited to a control reservation signal path that goes from each node 12 in all dimensions interfacing all neighbors of each node 12 of the single or multi-dimensional network 11. The electrical control signal is dispatched from a sender node ahead of time before sending the optical signal, to dynamically reserve optical path 30 of inter-nodal optical links. Preferably, a complete optical path is reserved by the scouting electrical signal; otherwise, a dynamic optical path is created from the sender to an intermediate node for conversion/buffering as far along a path and as close as possible to the destination node. Generally, an optical pathway established by configuring optical switches at the scouted nodes in the network can be used in a next data transmission cycle.

After launching electrical control signal from originating node n at 105, the electrical signal reaches the next node n+1 (e.g., a node 21 as shown in FIG. 1), en route to the destination node. At 110, the controlling originator node (processor node 20 in FIG. 1) determines availability of a corresponding optical link to that node n+1 such as, for example, by receipt of an acknowledge (ACK) signal (not shown) from the scouted node. If it is determined that at 110, an optical link from the sender node 12 is available for switching at a time for the next packet transmission cycle (such as by receiving an ACK signal, for example), then at 115, the optical switch at current node n+1 of a destination path is reserved with electrical signals. The reservation signal can be the same signal as the scouting signal, in one embodiment, or a different signal, in another embodiment. The reservation signal programs the optical switch at that node to ensure an optical link is reserved between the first sending node (e.g., node n) and the current scouted node n+1 along path. Thus, in this iteration, for example, the steps 105, 110, 115, are run to first reserve that portion of optical path between node 20 and node 21 for the following cycle. The control signals generated to reserve the optical links at the nodes is described in aforementioned U.S. Pat. No. 6,816,637 the whole content and disclosure of which is incorporated by reference as if fully set forth herein.

From 115, once the optical switch at next node n+1 of a destination path is programmed to receive an electrical signal to actuate the optical switch to ensure an optical link is reserved between the sender i and the current node n+1, a determination is then made at 130 as to whether the current node n+1 of a destination path is the last or destination node 40. If the current node is not the destination node of the path, then the process proceeds to step 131 where the variable "n" representing next node to be evaluated for available link determination is incremented, i.e., n:=n+1, and the process repeats by returning to 105, FIG. 2.

In FIG. 2, steps 105, 110, 115, 130 and 131 are continuously iterated so that at each iteration, the intermediate reserved node (e.g., node n) launches an electrical scout signal at 105 to the next further node of the path (e.g., node n+1, where n is incremented at each iteration). Thus, in a next iteration, for example, the steps 105, 110, 115, 130 will be run to establish that portion of optical path between node 22 and node 21 of path 30. And, in a next iteration, for example, the steps 105, 110, 115, 130 will be run to establish that portion of optical path between node 23 and node 22 of path 30. In this manner, a single optical link of the path is successively created between each current node and its immediate prior node so that the destination path progressively gets bigger as a result of each successive launch until a destination node, e.g., node 40 in FIG. 1, and thus a full path, is reached. Thus, if at 130, it is determined that the last n+1 node is the destination node, the process proceeds to step 135 where the optical data packet is launched from the original sender node 20 along the created optical path to destination node 40. Afterwards, at step 147, after transmission of the data packet along the optical path, all optical switch reservations at nodes of the path are then released.

However, as shown in FIG. 1, while the destination path 30 progressively gets bigger as a result of each successive scout signal launch, it is the case that a link to the next node along the path to the destination node is not available, and, thus, a full optical path to the destination node is not available via that path. For example, an optical link may not be available between intermediate node, e.g., node 23 in FIG. 1, and a node 24. In this case, a furthest node as possible is reached-in which case, packet is sent to and buffered at the furthest node possible.

Referring back to step 110, FIG. 2, if it is determined that an optical link from the intermediate node n to the next node n+1 is not available for switching at a time for the next packet transmission cycle, then the process continues to 120. In one embodiment, an optical link may be determined as unavailable if an ACK signal is not received at the sending node, for example. At step 120, a determination is made as to whether an alternative optical path to the destination node 40 is available. That is, at 120, a decision is made as to whether an optical link is available for reservation to another next node n+1 of a destination path (for example, by trying to use a different dimension). Referring back to FIG. 1, thus, from node 23, it may be determined if new node 26 (a new path) is available for optical link creation. If, at 120, it is determined that a next node is available along a new path, then, at 125, at next node of a new path, the optical switch is programmed to form optical link from node n to node n+1 along new path, a portion of which is depicted as new path portion 31 to the destination node 40 (In FIG. 1). Referring back to FIG. 2, if at 120, it is determined that a new link can be created along a new path to the destination, then the process proceeds to step 125 to program the optical switch at the node n+1 along the new path to actuate the optical switch to ensure an optical link is reserved between the sender i and the current node n+1. After this, the process proceeds back to step 130, 131, and eventually back to step 105, where the process steps 105, 110, 115, 130 will again be run to scout out a next optical link, e.g., establish that portion 32 of optical path between new node (node 26) and the destination node (node 40) as shown in FIG. 1. For example, after establishing the optical link along new path 32 at step 115, a determination at step 130 will indicate that the last node, i.e., destination node 40, has been reached. Having successfully completed an optical path (paths 30, 31 and 32) from sender node 20 to node 40, then the process proceeds to step 135 where the optical data packet is launched from the sender node 20 along the created path (30, 31 and 32) to destination node 40. Afterwards, at step 147, after transmission of the data packet along the optical link, all reservations are then released.

Returning back to 120, FIG. 2, if it has been determined that there is no available optical link to complete the path of links to the destination node, then at 140, the optical data packet will be launched along optical network path formed from the source node i to the current node n where the data packet will be received at that node and buffered, i.e., the packet contents temporarily stored in a memory storage device, at 145, associated with that node. The process then repeats by returning to step 104 in which case the last node having the buffered content, becomes the sender (originating) node i and the method waits until the new optical link becomes available between the new sender node 23 and destination node 40 such that the original data packet (stored at the buffer) can be communicated to its destination node.

Thus, returning to FIG. 1, for example, after having already established optical link pathway 30 from node 20 to node 23, if no direct link or alternate link(s) are available between node 23 to the destination node 40, then the packet released from originating node 20 is transmitted for communication across the optical path 30 to the furthest node possible, e.g., node 23, for buffering thereat. Only by sending out new electrical scout signals will the new path to the destination node be established.

As mentioned, in one hardware implementation, the method may be used in the optical switching for network routing on a printed circuit board (PCB) board. The implementation shown in FIG. 1 thus includes an example where multiple compute nodes, each including a processor device 12, are located on a single board (node board) to form an example 4×4 mesh. Using optical waveguides and optical switches, packets are routed over the network on the board.

Figure 4:
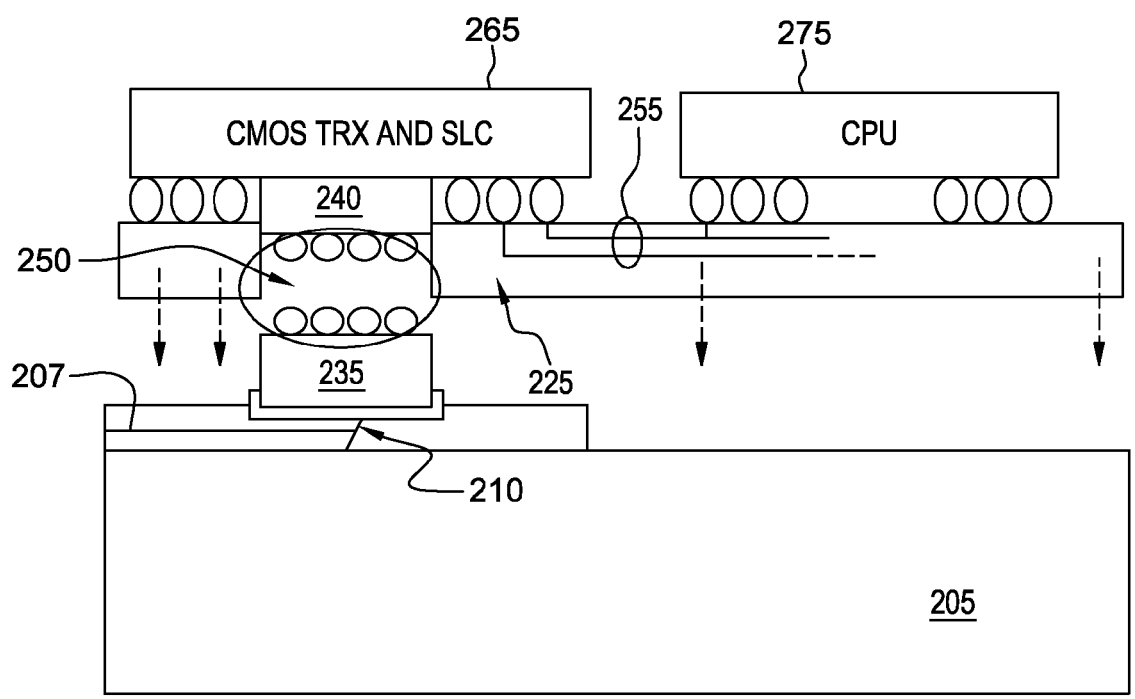
FIG. 4 shows an example optical communications apparatus 200 that may represent a single compute node 12 in one embodiment; and, FIG. 5 shows a general system diagram of a multi-level network 200 implementing multiple many-to-many routers, such as the mesh routers of the embodiment of FIG. 3.

FIG. 4 shows an example optical communications apparatus 200 that may represent a single compute node 12 in one embodiment. Apparatus 200 includes printed circuit board (PCB) substrate 205 as shown in FIG. 4 where board includes optical waveguides 207 that routes optical signals to another compute node 12 on the mesh via one or more optical switches. Switches may implement turning one or more mirrors, such as minor 210, that may be programmed to route optical signals to a processor device 275 mounted on a carrier module 225. Optical signals may be routed from minor 210 of the switch to the optoelectronic coupler 250 to where they are converted to electrical signals. The converted optical to electrical signals are received at a receiver/amplifier of translator/converter apparatus 265, and then these electrical signals are routed on the carrier 225 via conductors 255 to the processing node 275. In one embodiment, carrier 225 may be mounted on PCB substrate 205. In another embodiment, the converter functionality 265, conductors 255 and processor 275 can be implemented in a single chip. Likewise, electrical signals may be routed to the PCB substrate waveguides 207 as optical signals via optoelectronic coupler 250.

Generally, in one example and non-limiting embodiment, as known in the art, optoelectronic coupler 250 includes lens array 235 that receives optical signals from optical links 207 via programmed mirror 210, and couples them to aligned lenses of optoelectronic devices 240 which are adapted to receive and convert them to corresponding electronic signals. The converted optical to electrical signals are received at a receiver/amplifier of translator/converter apparatus 265 where they can be converted and routed via conductors 255 on the carrier 225 to a processor device, e.g., central processing unit (CPU) 275 and/or memory (not shown) for processing and/or buffering. Likewise, in one embodiment, electrical signals from CPU 275 are received at translator/converter device 265 over conductors 255 of module 225 where converter/driver circuits receive and convert the electrical signals to corresponding optical signals, and corresponding optoelectronic devices 240 drive the optical signals via lenses for receipt at aligned lenses of lens array 235 where they are routed via programmed minor 210 over waveguides 207 to other nodes via optical switches and waveguide links 207.

It should be understood there could be multiple processor chips or cores with corresponding memory (not shown) on the carrier 225 only one being shown as represented as the computing device at the node 12, each with a corresponding transceiver 265 and optical coupler 250 configuration to detect/receive convert and drive optical signals. Chips could be one of a set of processor chips.

Figure 3:
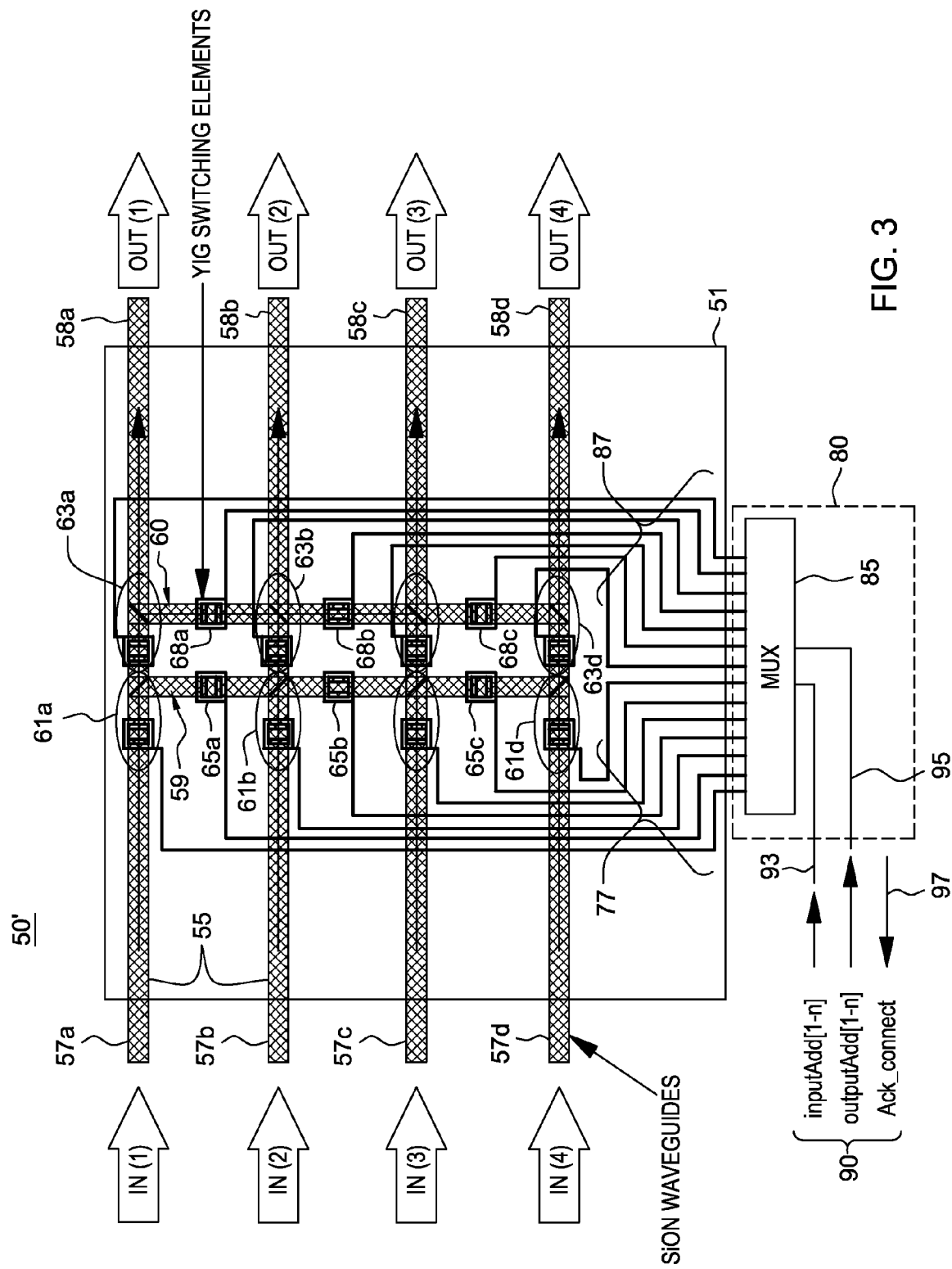
FIG. 3 shows one embodiment of a dynamic optical switch 50' that may be configured as a many-to-many switch router associated with a single node in one embodiment.

FIG. 3 shows one embodiment of a dynamic optical switch 50' that may be configured as a many-to-many switch router associated with a single node in one embodiment, for example. As shown in FIG. 3, switch router 50', in one embodiment, is a four by four (4×4) router formed on a ground place 51 that includes four parallel optical links 55, e.g., four waveguides, such as a SiON waveguide, that carries optical signals input to and output from the switch. Four links 55 provide four optical signal inputs 57a-57d and corresponding optical signal outputs 67a-67d for output from the node. In one embodiment, coupled to and transversely oriented to the links 55 are optical waveguides or links 59 and 60. Under control of multiple, electrical-controlled optical switches, waveguides 55 and 59 and 60 optical signals are configurable to couple optical signals form any one of the signal inputs 57a-57d to any one of the signal outputs 58a-58d, for the example 4×4 router configuration shown. In support of router function, in one embodiment, electrically controllable YIG optical switches 61a-61d configure a turning minor at each switch, as shown in FIG. 3, and further electrically controllable YIG optical switches 65a-65c are programmable via electrical control current signals conducted on electrical control conductor lines 77 that can configure the waveguide 59 to couple an optical signal to one of the output links 58a-58d. Further, in one embodiment, electrically controllable switches 63a-63d and further electrically controllable YIG optical switches 68a-68c are programmable via electrical control current signals conducted on electrical control conductor lines 87 that can configure the waveguide portion 60 to route a received optical signal at any waveguide input 57a-57d to any output optical waveguide 58a-58d.

In one embodiment, via switching control according to combinations of signal values on signal lines 77, 87, any optical signal received on an optical signal input 57a-57d may be routed to another network node via any optical signal output 58a-58d. Driver signals are signals from a network driver at a sender or originating node that is communicating the data. In one embodiment of FIG. 3, signals may include operational circuitry 80, including a multiplexor element (MUX) 85 that convert the network drive signals, e.g., signals 90, from an originating or sender node to electrical control signals. In one example drive signals 90 may comprise several bits in order to configure the various switches for signal routing. For example, three (3) bit input signals 93 input to MUX 85 may configure seven electrical control signal lines 77 with signals for controlling switches 61a-61d and 65a-65c to control routing of optical signals to/from link 59, for example. Likewise, three (3) bit input signals 95 may be input to MUX 85 may configure the electrical control signal lines 87 with signals for controlling switches 63a-63d and 68a-68c to control routing of optical signals to/from link 60. All or any combination of these switches may be dynamically set ahead of time, i.e., ahead of the transmission of the actual data packets. Once switch router 50' is configured, the acknowledgement signal 97 is driven.

In a further embodiment, the MUX 85 may be replaced by other types of switch driver signal inputs that respond to electrical signals from the node for configuring the optical switches.

In a further alternative embodiment, there is provided a software approach to programming optical signal routing using routing tables. In this scheme a routing table is maintained at each nodes 12 of the network 11 (e.g., the 4×4 mesh such shown in FIG. 1). Prior to routing, from a sending node, a calculation is performed (e.g., at a controlling node or node dedicated for sending out the scouting signals) to determine a destination of the packet. For each destination node, a list of possible pathways is read, which list informs which switches are set (turned on) or need to be turned on for that particular path. The switch configuration signals for configuring the switches in the mesh at each node to create an optical path are then generated and sent ahead of time. In one example, the signals for configuring the paths at the switches, for example, are generated during the time data are moved from the system's memory into the network buffers (not shown) at the sending or originating node. Alternatively, the signals for configuring the paths at the switches, for example, are generated during the time a calculation is being performed or while moving a result of the calculation to the network buffer, such that the path is configured ahead of time before data for transmission is ready by sending out and initialize the routers providing links to form the optical path. As part of this process, the controlling node or device may have to wait for an acknowledgement signal or some type of handshake signal that confirms the switch for that path has been set. The setting of the optical switch routers in nodes 12 enables configuration of an optical path form the links 15, from the source node to the destination node, or to a node as far along a path to the destination as possible. For example, the paths are read out of a table at the node to obtain a configuration. The data packet(s) is(are) then communicated after the switches are set to establish the optical path.

As an illustration, in view of FIG. 1, one possible example of this routing table, here listing only one entry (one possible path), located on the source node 20 for the destination node 40 could be: 21-27-28-24-40 representing that the packet can be routed to the destination node 40 via the nodes 21, 27, going to 28, and then via 24 to the destination node 40.

In a further embodiment, there is a further chip at the node that makes only routing decisions by the other CPU, i.e., a dedicated processor making decisions. For example, the destination of computational output may be before the computation is finished.

In a further embodiment, there may be built more complex networks with multi-level switches, where a dynamic optical path is created for routing signals among multiple hops between or among a plurality of cards, or, hierarchical levels.

Figure 5:
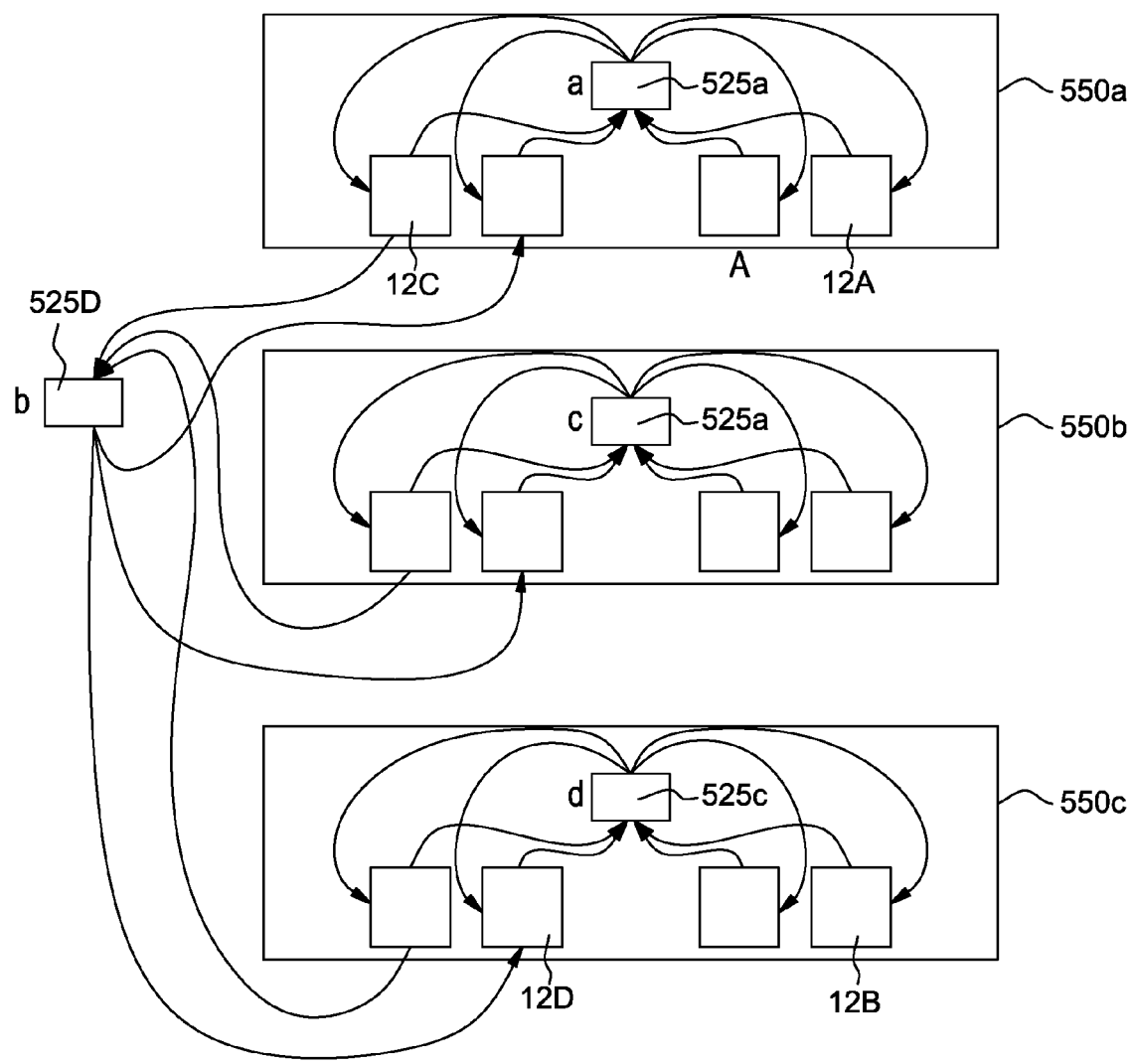

For example, in a multi-level network 500 shown in FIG. 5, there are implemented multiple many-to-many routers, such as the routers of the embodiment depicted in FIG. 3. The embodiment of network 500 of FIG. 4 shows three "planes" 550a, 550b, 550c, with each plane comprising a card or PCB having nodes 12 and a switch at a certain level or hierarchy. Each plane 550a, 550b, 550c has a respective switch router apparatus 525a, 525b and 525c. Additionally, there is a inter-plane switch 525d.

In intra-plane routing of data, data is sent in one hop by configuring the switch router on the plane. For example, by sending data from 12A on plane 550a to node 12C on plane 550a, only the switch router 525a will be used. For sending data on another plane, there is implemented inter-plane router 525d. For example, by sending data from 12A on plane 550a to node 12B on plane 550c. There is first configured switch "a" 525a to send data to exit node on that plane 550a, e.g., node 12C. Node 12C sends the data to the inter-plane switch "b" 525d that is configured to send data to node 12D on plane 550c. The switch "d" 525c is configured to receive data from the data from the node 12D to the destination node 12B. Once all switches are reserved for this connection and optical link is set, transfer of data from 12A to 12C is performed without intermediate buffering, and data is transferred from the originating node to the destination node optically.

Although the embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and run, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to affect one or more functions of this invention. Furthermore, the present invention may be implemented as a program storage device readable by machine, tangibly embodying a program of instructions executable by the machine to perform method steps for causing one or more functions of this invention.

The present invention may be implemented as a computer readable medium (e.g., a compact disc, a magnetic disk, a hard disk, an optical disk, solid state drive, digital versatile disc) embodying program computer instructions (e.g., C, C++, Java, Assembly languages, Net, Binary code) run by a processor (e.g., Intel® Core™, IBM® PowerPC®) for causing a computer to perform method steps of this invention. The present invention may include a method of deploying a computer program product including a program of instructions in a computer readable medium for one or more functions of this invention, wherein, when the program of instructions is run by a processor, the computer program product performs the one or more of functions of this invention. The present invention may include a computer program product for performing one or more of functions of this invention. The computer program product comprises a storage medium (e.g., a disk drive, optical disc, solid-state drive, etc.) readable by a processing circuit (e.g., a CPU or processor core) and storing instructions run by the processing circuit for performing the one or more of functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

The word "comprising", "comprise", or "comprises" as used herein should not be viewed as excluding additional elements. The singular article "a" or "an" as used herein should not be viewed as excluding a plurality of elements. Unless the word "or" is expressly limited to mean only a single item exclusive from other items in reference to a list of at least two items, then the use of "or" in such a list is to be interpreted as including (a) any single item in the list, (b) all of the items in the list, or (c) any combination of the items in the list. Ordinal terms in the claims, such as "first" and "second" are used for distinguishing elements and do not necessarily imply order of operation. The use of variable names in describing operations in a computer does not preclude the use of other variable names for achieving the same function. Items illustrated as boxes in flowcharts herein might be implemented as software or hardware as a matter of design choice by the skilled artisan. Software might include sequential or parallel code, including objects and/or modules. Modules might be organized so that functions from more than one conceptual box are spread across more than one module or so that more than one conceptual box is incorporated in a single module. Data and computer program code illustrated as residing on a medium might in fact be distributed over several media, or vice versa, as a matter of design choice.

What is claimed is:

1. A system for communicating optical signals in an optical circuit switched network of a multi-node computing system, said system comprising:

a memory storage device located at a node;

a processor device operatively in communication with said memory storage device and configured to perform a method comprising:

forming, using electrical signals, an optical path from a sender node to a destination node in said network, said sender node having a data packet for communication as an optical signal along said optical path to said destination node, said forming an optical path is an iterative process, said processor device configured, at each iteration, to:

launch an electrical signal over a conductor from said sender node to a next node of said network, wherein a next node at each iteration is a node adjacent to an immediately prior node having a formed optical link;

determine availability at the next node to reserve an optical link to that next node for an optical signal transmission; and drive optical switches at the available next node using said electrical signals to form said optical link, wherein said next node becomes a next sender node, and repeat, at each said next sender node, said launching an electrical signal, said determining next node availability and said optical link reserving to form said optical path for as many adjacent optically linked next nodes as available or until said next node becomes said destination node;

wherein only if a next node is determined unavailable to form an optical link, said processor device is configured to:

launch said optical signal having said data packet from said sender node, over said formed optical path, to a last available next node, transfer said data packet in said optical signal to said last available next node, and buffer said data packet to a memory storage device associated with said last available next node; and, determine when another next node becomes available to extend said optical path from said last available next node toward said destination node by repeating, at said last available next node, said launching an electrical signal, said determining next node availability and said optical link reserving to form said optical path for as many adjacent optically linked next nodes as available or until said next node becomes said destination node;

otherwise, launching, from said sender node, an optical signal having data packet, over said optical path, to said destination node without a need for packet buffering of data from said optical signal at computing nodes forming said optical path.

2. The system of claim 1, wherein said processor device is configured to further perform:

releasing all reserved optical links for reuse after said optical signal launching.

3. The system of claim 1, wherein said forming an optical path comprises configuring said processor device to:

launch an electrical signal over a conductor from said sender node to a plurality of nodes of said network to form said optical path;

determine availability at each node of said plurality of nodes, to form an optical link at that node for an optical signal transmission; and use electrical signals to drive optical switches at those nodes having available optical links that can form said optical path, wherein said optical path is formed for as many adjacent optically linked nodes as available.

4. The system of claim 3, wherein when a next node is determined not available to form an optical link, said processor device is configured to:

launch an electrical signal over a conductor from a sender node to an additional next node of an optical path adjacent a last next node having an optical link formed in said optical path; and determine availability of said additional next node for establishing optical link with a last node having said optical link formed in said optical path; and, wherein when said additional next node is determined available, launch further electrical signals for programming an optical switch at said additional next node to extend said optical pathway for said optical signal between said sender node and additional next node.

5. The system of claim 1, wherein said data packet includes a computational output of said processor device operating at said sending node, said forming said optical path occurring while said processor device performs said computation providing said output.

6. The system of claim 5, wherein said processor device operating to provide said computational output at said sender node, is a same processor device that launches said electrical signals for use in forming optical path.

7. The system of claim 5, further comprising:

a dedicated processing device operating to provide launch said electrical signals for use in forming said optical path.

8. The system of claim 1, wherein said optical switches include a multi-level switch whereby a formed optical path may traverse computing nodes at different hierarchical levels or physical structures.

9. A non-transitory computer readable medium embodying computer program instructions being executed by a processor device for causing a computer to perform method steps for communicating optical signals in an optical circuit switched network having multiple computing nodes, said method steps comprising:

forming, using electrical signals, an optical path from a sender node to a destination node in said network, said sender node having a data packet for communication as an optical signal along said optical path to said destination node, said forming an optical path is an iterative process, said processor device configured, at each iteration, to:

launch an electrical signal over a conductor from said sender node to a next node of said network, wherein a next node at each iteration is a node adjacent to an immediately prior node having a formed optical link;

determine availability at the next node to reserve an optical link to that next node for an optical signal transmission; and drive optical switches at the available next node using said electrical signals to form said optical link, wherein said next node becomes a next sender node, and repeat, at each said next sender node, said launching an electrical signal, said determining next node availability and said optical link reserving to form said optical path for as many adjacent optically linked next nodes as available or until said next node becomes said destination node;

wherein only if a next node is determined unavailable to form an optical link, said processor device is configured to:

launch said optical signal having said data packet from said sender node, over said formed optical path, to a last available next node, transfer said data packet in said optical signal to said last available next node, and buffer said data packet to a memory storage device associated with said last available next node; and, determine when another next node becomes available to extend said optical path from said last available next node toward said destination node by repeating, at said last available next node, said launching an electrical signal, said determining next node availability and said optical link reserving to form said optical path for as many adjacent optically linked next nodes as available or until said next node becomes said destination node;

otherwise, launching, from said sender node, an optical signal having data packet, over said optical path, to said destination node without a need for packet buffering of data from said optical signal at computing nodes forming said optical path.

10. The non-transitory computer readable medium of claim 9, wherein said forming an optical path comprises:

releasing all reserved optical links for reuse after said optical signal launching.

11. The non-transitory computer readable medium of claim 9, wherein said forming an optical path comprises:

launching an electrical signal over a conductor from said sender node to a plurality of nodes of said network to form said optical path;

determining, by said sender node, availability at each node of said plurality of nodes, to form an optical link at that node for an optical signal transmission; and using electrical signals, by said sender node, to drive optical switches at those nodes having available optical links that can form said optical path, wherein said optical path is formed for as many adjacent optically linked nodes as available.

12. The non-transitory computer readable medium of claim 9, further comprising:

determining a destination node at which said sender node is to transmit said data packet via optical signal;

providing at each node, a routing table providing a list of signal routing links associated with each node;

for the determined destination node, determining from said routing table those possible signal routing links and any associated optical switches that are currently set or need to be set for a particular path;

generating optical switch configuration signals for configuring the switches that need to be set at a respective node to create said optical path; and sending those optical switch configuration signals ahead of launching said optical signal.

* * * * *